US011363425B2

(12) United States Patent
Zhao

(10) Patent No.: US 11,363,425 B2
(45) Date of Patent: Jun. 14, 2022

(54) SYSTEMS AND METHODS FOR LOCATING A WIRELESS DEVICE

(71) Applicant: BEIJING DIDI INFINITY TECHNOLOGY AND DEVELOPMENT CO., LTD., Beijing (CN)

(72) Inventor: Renyu Zhao, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 59 days.

(21) Appl. No.: 17/073,514

(22) Filed: Oct. 19, 2020

(65) Prior Publication Data

US 2021/0037356 A1  Feb. 4, 2021

Related U.S. Application Data

(63) Continuation of application No. 16/194,506, filed on Nov. 19, 2018, now Pat. No. 10,812,949, which is a (Continued)

(30) Foreign Application Priority Data

Jun. 7, 2016 (CN) .......................... 201610409715.1

(51) Int. Cl.
*H04W 4/00* (2018.01)
*H04W 4/33* (2018.01)
(Continued)

(52) U.S. Cl.
CPC ................. *H04W 4/33* (2018.02); *G01S 5/02* (2013.01); *G01S 5/0252* (2013.01); *G01S 5/14* (2013.01);
(Continued)

(58) Field of Classification Search
CPC ........ G01S 5/0252; G01S 19/39; G01S 19/31; G01S 5/14; G01S 19/48; H04W 64/00; H04W 64/003; H04W 4/33; H04W 4/02
See application file for complete search history.

(56) References Cited

U.S. PATENT DOCUMENTS 6,154,656 A   11/2000  Camp, Jr.
8,279,840 B2  10/2012  Walker, Sr.
(Continued)

FOREIGN PATENT DOCUMENTS

CN    1250266 A    4/2000
CN  101339588 A    1/2009
(Continued)

OTHER PUBLICATIONS

Wang, Xuemin., Joint confidence interval, Applied multivariate analysis, Shanghai University of Finance and Economics Press, 2014, 6 pages.
(Continued)

*Primary Examiner* — Pakee Fang
(74) *Attorney, Agent, or Firm* — Metis IP LLC

(57) ABSTRACT

A system may include at least one computer-readable storage medium including a set of instructions for locating a wireless device having wireless fidelity (WiFi) capability, and at least one processor in communication with the computer-readable storage medium, wherein when executing the set of instructions, the at least one processor is directed to: obtain a positioning request from the wireless device, the wireless device is in communication with at least one WiFi network; obtain WiFi data from the wireless device; and determine a default location associated with the WiFi data as a location of the wireless device.

18 Claims, 9 Drawing Sheets

Related U.S. Application Data continuation of application No. PCT/CN2017/082744, filed on May 2, 2017.

(51) Int. Cl.
| | |
|---|---|
| *H04W 4/02* | (2018.01) |
| *G01S 5/02* | (2010.01) |
| *G01S 19/39* | (2010.01) |
| *G01S 19/48* | (2010.01) |
| *G01S 5/14* | (2006.01) |
| *G01S 19/31* | (2010.01) |
| *H04W 64/00* | (2009.01) |
| *H04W 4/021* | (2018.01) |
| *H04W 4/80* | (2018.01) |

(52) U.S. Cl.
CPC .............. *G01S 19/31* (2013.01); *G01S 19/39* (2013.01); *G01S 19/48* (2013.01); *H04W 4/02* (2013.01); *H04W 64/003* (2013.01); *H04W 4/021* (2013.01); *H04W 4/80* (2018.02)

(56) References Cited

U.S. PATENT DOCUMENTS

| | | | |
|---|---|---|---|
| 8,320,939 | B1 | 11/2012 | Vincent |
| 8,849,308 | B2 | 9/2014 | Marti et al. |
| 8,996,037 | B2* | 3/2015 | Chen ............... G01S 5/0252 455/456.6 |
| 9,107,178 | B2* | 8/2015 | Sydir ............... H04W 64/00 |
| 10,616,714 | B2* | 4/2020 | Atreya ............... H04W 4/80 |
| 2007/0202887 | A1 | 8/2007 | Counts et al. |
| 2011/0018732 | A1 | 1/2011 | Cho et al. |
| 2011/0128183 | A1 | 6/2011 | Marshall |
| 2012/0075141 | A1 | 3/2012 | Kosolobov et al. |
| 2013/0157683 | A1 | 6/2013 | Lymberopoulos et al. |
| 2014/0141803 | A1 | 5/2014 | Marti et al. |
| 2014/0194139 | A1* | 7/2014 | Yang ............... G01S 5/0252 455/456.1 |
| 2014/0341198 | A1 | 11/2014 | Han |
| 2015/0172854 | A1 | 6/2015 | Stogaitis et al. |
| 2015/0181552 | A1 | 6/2015 | Bajko |
| 2015/0331085 | A1 | 11/2015 | Mun et al. |
| 2016/0018507 | A1 | 1/2016 | Chen et al. |
| 2017/0026850 | A1 | 1/2017 | Smith et al. |

FOREIGN PATENT DOCUMENTS

| | | |
|---|---|---|
| CN | 102075936 A | 5/2011 |
| CN | 102348160 A | 2/2012 |
| CN | 103200678 A | 7/2013 |
| CN | 103458369 A | 12/2013 |
| CN | 103476113 A | 12/2013 |
| CN | 105101406 A | 11/2015 |
| CN | 105430608 A | 3/2016 |
| EP | 3174319 A1 | 5/2017 |
| JP | 2013152097 A | 8/2013 |
| JP | 2013205226 A | 10/2013 |
| JP | 2015102461 A | 6/2015 |
| KR | 20110061978 A | 6/2011 |
| WO | 2015117396 A1 | 8/2015 |

OTHER PUBLICATIONS

Liu, Qing et al., Confidence region and joint confidence interval of the overall mean vector, Encyclopedia of Chinese Medical Statistics Multivariate Statistics, China Statistics Press, 2013, 2 page.
International Search Report in PCT/CN2017/082744 dated Jul. 20, 2017, 4 pages.
Written Opinion in PCT/CN2017/082744 dated Jul. 20, 2017, 4 pages.
The Extended European Search Report in European Application No. 17809586.5 dated Mar. 28, 2019, 9 Pages.
First Office Action in Chinese Application No. 201610409715.1 dated Feb. 1, 2019, 11 Pages.
The second Office Action in Chinese Application No. 201610409715.1 dated Sep. 4, 2019, 16 pages.
The Examination Report in Australian Application No. 2017276404 dated Oct. 16, 2019, 6 pages.
Notice of Preliminary Rejection in Korean Application No. 10-20187034406 dated Feb. 12, 2020, 11 pages.
Notice of Rejection in Japanese Application No. 2019516042 dated Feb. 3, 2020, 11 pages.
First Office Action in Chinese Application No. 201780035358.X dated Apr. 14, 2020, 20 pages.

* cited by examiner

SYSTEMS AND METHODS FOR LOCATING A WIRELESS DEVICE

CROSS-REFERENCE TO RELATED APPLICATIONS

This application is a continuation of U.S. Ser. No. 16/194,506 filed on Nov. 19, 2018, which is a continuation of International Application No. PCT/CN2017/082744, filed on May 2, 2017, which claims priority to Chinese Patent Application No. 201610409715.1, filed on Jun. 7, 2016, the contents of all of which are incorporated herein in their entirety by reference.

TECHNICAL FIELD

The present disclosure generally relates to technology field of wireless Location Based Service (LBS), and in particular, systems and methods for locating a wireless device based on WiFi data.

BACKGROUND

Location Based Service (LBS) has become an essential feature for a wireless device, referring to the geographic coordinates of the wireless device, and/or a user thereof. Global positioning system (GPS) based method provides global location information and have a relatively high degree of accuracy, however a problem with the GPS based method is that the GPS signal is often shielded by structures such as buildings, trees, bridges, and concrete objects. Methods and systems for locating a wireless device with high degree of accuracy in structures are widely welcomed and in high demand.

SUMMARY

According to an aspect of the present disclosure, a system may include at least one computer-readable storage medium including a set of instructions for locating a wireless device having wireless fidelity (WiFi) capability, and at least one processor in communication with the computer-readable storage medium, wherein when executing the set of instructions, the at least one processor is directed to: obtain a positioning request from the wireless device, the wireless device is in communication with at least one WiFi network; obtain WiFi data from the wireless device; and determine a default location associated with the WiFi data as a location of the wireless device.

In some embodiments, the WiFi data is associated with at least one structure, and the default location includes an entrance of the at least one structure.

In some embodiments, the at least one structure shields global positioning system (GPS) signals.

In some embodiments, the wireless device has global positioning system (GPS) capability, and the at least one processor is further directed to: obtain a trace of locations of the wireless device according to GPS signals associated with the wireless device, the trace including a breakpoint at where the at least one WiFi network is located; and determine the default location based on the trace.

In some embodiments, to determine the default location associated with the WiFi data, the at least one processor is further directed to: receive a WiFi fingerprint detected by the wireless device; and determine at least one candidate WiFi fingerprint from a WiFi fingerprint library based on similarity between the WiFi fingerprint and reference WiFi fingerprints in the WiFi fingerprint library, each of the at least one candidate WiFi fingerprint being associated with at least one candidate default location and each candidate default location being associated with at least one candidate WiFi fingerprint.

In some embodiments, the WiFi fingerprint includes a combination of identity of at least one WiFi detected by the wireless device and signal strength of the at least one WiFi.

In some embodiments, to determine the default location associated with the WiFi data, the at least one processor is further directed to, for a candidate default location of the at least one candidate default location, identify one or more candidate WiFi fingerprints associated with the candidate default location; for each of the one or more candidate WiFi fingerprint, determine a probability component contributed by the candidate WiFi fingerprint and associated with a probability that the candidate default location is the default location; determine an overall probability value that the candidate default location is the default location based on the one or more probability components; and determine the default location from the at least one candidate default location based on the at least one overall probability value.

In some embodiments, the at least one processor is further directed to: for each of a plurality of wireless devices that appeared within a distance from the structure, collect a WiFi fingerprint detected by the wireless device; and establish the WiFi fingerprint library based on the WiFi fingerprints collected from the plurality of wireless device.

According to another aspect of the present disclosure, a method for locating a wireless device having wireless fidelity (WiFi) capability may include obtaining a positioning request from the wireless device, the wireless device being in communication with at least one WiFi network; obtaining WiFi data from the wireless device; and determine a default location associated with the WiFi data as a location of the wireless device.

In some embodiments, the WiFi data is associated with at least one structure, and the default location includes an entrance of the at least one structure.

In some embodiments, the at least one structure shields the global positioning system (GPS) signals.

In some embodiments, the wireless device has global positioning system (GPS) capability, and the method may further include: obtaining a trace of locations of the wireless device according to GPS signals associated with the wireless device, the trace including a breakpoint at where the at least one WiFi network is located; and determining the default location based on the trace.

In some embodiments, the determining of the default location associated with the WiFi data may include: receiving a WiFi fingerprint detected by the wireless device; and determining at least one candidate WiFi fingerprint from a WiFi fingerprint library based on similarity between the WiFI fingerprint and reference WiFi fingerprints in the WiFi fingerprint library, each of the at least one candidate WiFi fingerprint being associated with at least one candidate default location and each candidate default location being associated with at least one candidate WiFi fingerprint.

In some embodiments, the WiFi fingerprint includes a combination of identity of at least one WiFi detected by the wireless device; and signal strength of the at least one WiFi.

In some embodiments, the determining of the default location associated with the WiFi data further includes: for a candidate default location of the at least one candidate default location, identifying one or more candidate WiFi fingerprints associated with the candidate default location; for each of the one or more candidate WiFi fingerprint, determining a probability component contributed by the candidate WiFi fingerprint and associated with a probability that the candidate default location is the default location; determining an overall probability value that the candidate default location is the default location based on the one or more probability components; and determining the default location from the at least one candidate default location based on the at least one overall probability value.

In some embodiments, the method may further include: for each of a plurality of wireless devices that appeared within a distance from the structure, collecting a WiFi fingerprint detected by the wireless device; and establishing the WiFi fingerprint library based on the WiFi fingerprints collected from the plurality of wireless device.

According to still another aspect of the present disclosure, a non-transitory computer readable medium, comprising at least one set of instructions for locating a wireless device having wireless fidelity (WiFi) capability, when executed by at least one processor of a computer server, the at least one set of instructions directs the at least one processor to perform acts of: obtaining a positioning request from the wireless device, the wireless device being in communication with at least one WiFi network; obtaining WiFi data from the wireless device; and determine a default location associated with the WiFi data as a location of the wireless device.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
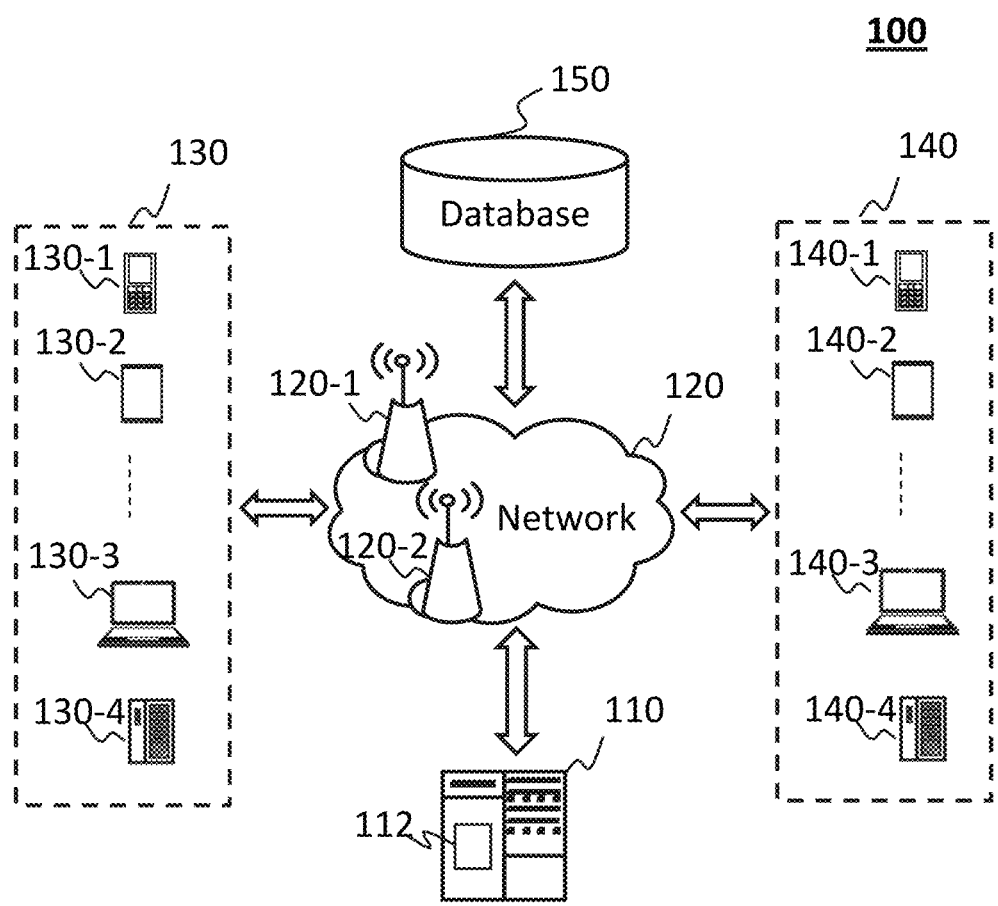
FIG. 1 is a block diagram of an exemplary system for on-demand service according to some embodiments.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

Moreover, while the system and method in the present disclosure is described primarily in regard to locate a wireless device, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request" in the present disclosure refers to a request that may be initiated by a passenger, a requester, a service requester, a customer, a driver, a provider, a service provider, a supplier, or the like, or any combination thereof. The request may be accepted by any one of a passenger, a requester, a service requester, a customer, a driver, a provider, a service provider, or a supplier. The request may be chargeable, or free.

The position and/or the location in the present disclosure may be acquired by positioning technology embedded in a wireless device (e.g., the passenger terminal, the driver terminal, etc.). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure. For example, the GPS-based method and the WiFi-based method may be used together as positioning technologies to locate the wireless device.

An aspect of the present disclosure relates to online systems and methods for locating a wireless device based on WiFi data. According to the present disclosure, the systems and methods may determine a default location of the wireless device based on WiFi data. The default location of the wireless device may be an entrance of a building or a group of buildings.

It should be noted that Location Based Service (LBS) provides a location for a wireless device and/or a user thereof. In an outdoor environment, GPS-based method provides global location information and a relatively high accuracy. However, the GPS signal becomes weak in an indoor environment, or around outdoor structures such as a tree, a bridge, or a concrete object. In an indoor environment where the GPS signal cannot accurately measure the location of the wireless device, the locating method such as WiFi-based method, Bluetooth-based method, ultrasound-based method, infrared-based method, etc., may provide a precise indoor location by virtue of a device. However, the precise indoor location often needs a high economic input for data acquisition and data updating. Moreover, the precise indoor location often has a poor application scenario and low accuracy. In some application scenarios, the LBS provides a default location of a wireless device when the wireless device is inside a building or among a group of buildings, which is often needed. For example, a passenger may get on a taxi at a default location when his/her wireless device requests a positioning request in a building or among a group of buildings, and a driver may pick up the passenger at the default location. The default location is not a precise location inside the building or among the group of building. The default location is just an entrance of the building or the group of buildings. The default location provides convenience for both the passenger and the driver.

It should be noted that Location Based Service (LBS) for online on-demand service is a new form of service rooted only in post-Internet era. It provides technical solutions to users that could raise only in post-Internet era. In pre-Internet era, GPS or navigation technology are not available. If a service provider needs to know a location of a service requester, the service requester usually provides the location to the service provider through telephone call. The location of the service requester may be difficult for the service provider to find without GPS and navigation technology. The LBS for online on-demand service, however, may allow the service provider to find the location of the service requester more easily. It may also provide a default location that is convenient for both the service requester and the service provider. Therefore, through Internet, the LBS for online on-demand service may provide a much more efficient service for the service provider and the service requester, which may never occur in the traditional pre-Internet era.

FIG. 1 is a block diagram of an exemplary system 100 as an online platform for on-demand service according to some embodiments. For example, the on-demand service system 100 may be an online transportation service platform for transportation services such as taxi hailing, chauffeur service, express car, carpool, bus service, driver hire and shuttle service. System 100 may include a server 110, a network 120, a passenger terminal 130, a driver terminal 140, and a database 150. The server 110 may include a processing engine 112.

The server 110 may be configured to process information and/or data relating to a service request. For example, the server 110 may determine a location for a wireless device. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in passenger terminal 130, driver terminal 140, and/or database 150 via network 120. As another example, the server 110 may be directly connected to the passenger terminal 130, the driver terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may obtain a positioning request from a wireless device. As another example, the processing engine 112 may obtain WiFi data from the wireless device. As still another example, the processing engine 112 may determine a default location associated with the WiFi data as a location of the wireless device. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a micro-controller unit, a reduced instruction-set computer (RISC), a microprocessor, or the like, or any combination thereof.

The network 120 may facilitate exchange of information and/or data. In some embodiments, one or more components in the system 100 (e.g., the server 110, the passenger terminal 130, the driver terminal 140, and the database 150) may send and/or receive information and/or data to/from other component(s) in the system 100 via the network 120. For example, the server 110 may obtain/acquire service request from the passenger terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the server 110 may include one or more network access points. For example, the server 110 may include wired or wireless network access points such as base stations and/or internet exchange points 120-1, 120-2, . . . , through which one or more components of the system 100 may be connected to the network 120 to exchange data and/or information.

The passenger terminal 130 may be used by a passenger to request an on-demand service. For example, a user of the passenger terminal 130 may use the passenger terminal 130 to send a service request for himself/herself or another user, or receive service and/or information or instructions from the server 110. In some embodiments, the term "user" and "passenger terminal" may be used interchangeably.

In some embodiments, the passenger terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. Merely by way of example, the passenger terminal 130 may include a controller (e.g., a remote-controller).

In some embodiments, the passenger terminal 130 may be a wireless device with positioning technology for locating the position of the user and/or the passenger terminal 130. In some embodiments, the passenger terminal 130 may communicate with other positioning device to determine the position of the user, and/or the passenger terminal 130. In some embodiments, the passenger terminal 130 may send positioning information to the server 110.

In some embodiments, the driver terminal 140 may be similar to, or the same device as the passenger terminal 130. In some embodiments, the driver terminal 140 may be a wireless device with positioning technology for locating the position of the driver and/or the driver terminal 140. In some embodiments, the passenger terminal 130 and/or the driver terminal 140 may communicate with other positioning device to determine the position of the passenger, the passenger terminal 130, the driver, and/or the driver terminal 140. In some embodiments, the passenger terminal 130 and/or the driver terminal 140 may send positioning information to the server 110.

The database 150 may store data and/or instructions. In some embodiments, the database 150 may store data obtained/acquired from the passenger terminal 130 and/or the driver terminal 140. In some embodiments, the database 150 may store data and/or instructions that the server 110 may execute or use to perform exemplary methods described in the present disclosure. In some embodiments, the database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the system 100 (e.g., the server 110, the passenger terminal 130, the driver terminal 140, etc.). One or more components in the system 100 may access the data or instructions stored in the database 150 via the network 120. In some embodiments, the database 150 may be directly connected to or communicate with one or more components in the system 100 (e.g., the server 110, the passenger terminal 130, the driver terminal 140, etc.). In some embodiments, the database 150 may be part of the server 110.

In some embodiments, one or more components in the system 100 (e.g., the server 110, the passenger terminal 130, the driver terminal 140, etc.) may have a permission to access the database 150. In some embodiments, one or more components in the system 100 may read and/or modify information related to the passenger, driver, and/or the public when one or more conditions are met. For example, the server 110 may read and/or modify one or more users' information after a service. As another example, the driver terminal 140 may access information related to the passenger when receiving a service request from the passenger terminal 130, but the driver terminal 140 may not modify the relevant information of the passenger.

In some embodiments, information exchanging of one or more components in the system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
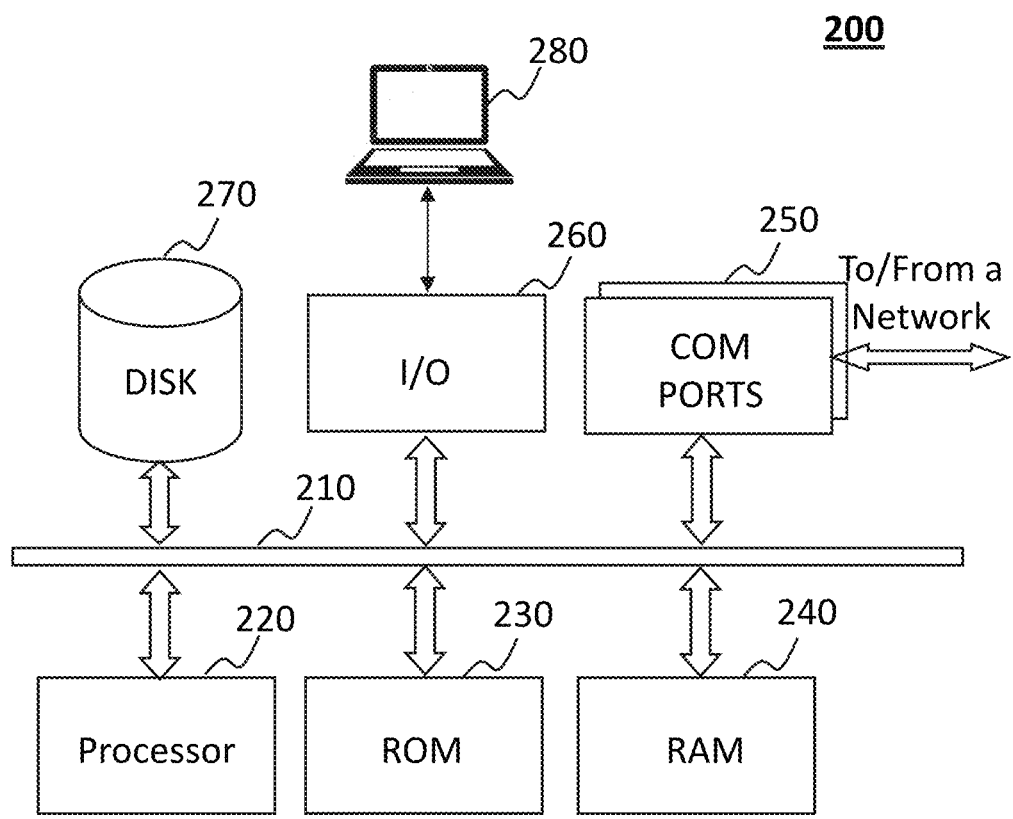
FIG. 2 is a schematic diagram illustrating exemplary hardware and software components of a computing device according to some embodiments.

FIG. 2 is a schematic diagram illustrating exemplary hardware and software components of a computing device 200 on which the server 110, the passenger terminal 130, and/or the driver terminal 140 may be implemented according to some embodiments of the present disclosure. For example, the processing engine 112 may be implemented on the computing device 200 and configured to perform functions of the processing engine 112 disclosed in the present disclosure.

The computing device 200 may be used to implement an on-demand system for the present disclosure. The computing device 200 may implement any component of the on-demand service as described herein. In FIGS. 1-2, only one such computer device is shown purely for convenience purposes. One of ordinary skill in the art would understood at the time of filing of this application that the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processor 220, in the form of one or more processors, for executing program instructions. The exemplary computer platform may include an internal communication bus 210, a program storage and a data storage of different forms, for example, a disk 270, and a read only memory (ROM) 230, or a random access memory (RAM) 240, for various data files to be processed and/or transmitted by the computer. The exemplary computer platform may also include program instructions stored in the ROM 230, the RAM 240, and/or other type of non-transitory storage medium to be executed by the processor 220. The methods and/or processes of the present disclosure may be implemented as the program instructions. The computing device 200 may also include an I/O component 260, supporting input/output between the computer and other components therein such as a user interface element 280. The computing device 200 may also receive programming and data via network communications.

Merely for illustration, only one processor 220 is described in the computing device 200. However, it should be note that the computing device 200 in the present disclosure may also include multiple processors, thus operations and/or method steps that are performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors jointly or separately in the computing device 200 (e.g., the first processor executes step A and the second processor executes step B, or the first and second processors jointly execute steps A and B).

Figure 3:
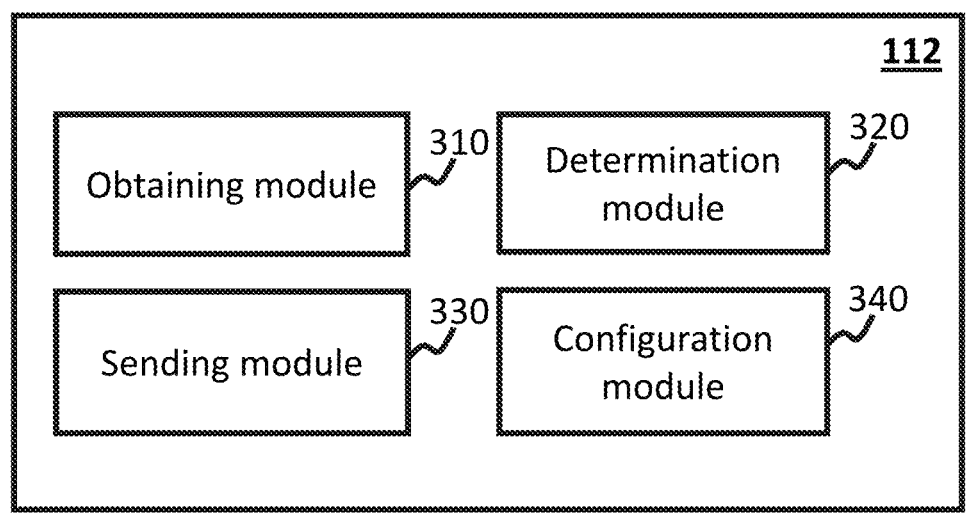
FIG. 3 is a block diagram of an exemplary processing engine according to some embodiments.

FIG. 3 is a block diagram illustrating an exemplary processing engine 112 according to some embodiments. The processing engine 112 may include an obtaining module 310, a determination module 320, a sending module 330, and a configuration module 340. The modules may be hardware circuits of all or part of the processing engine 112. The modules may also be implemented as an application or set of instructions read and executed by the processing engine. Further, the modules may be a combination of the hardware circuits and the application/instructions. For example, the modules may be the part of the processing engine 112 when the processing engine is executing the application/set of instructions.

The obtaining module 310 may be configured to obtain information from a wireless device (e.g., the passenger terminal 130, the driver terminal 140, etc.). For example, the obtaining module 310 may obtain a positioning request from the wireless device. As another example, the obtaining module 310 may obtain WiFi data from the wireless device. As still another example, the obtaining module 310 may obtain a trace of locations of the wireless device according to GPS signals associated with the wireless device.

The determination module 320 may be configured to determine information related to the service request. For example, the determination module 330 may determine a default location of the wireless device. As another example, the determination module 330 may determine at least one candidate WiFi fingerprint from a WiFi fingerprint library based on similarity between the WiFi fingerprint and reference WiFi fingerprints in the WiFi fingerprint library.

The sending module 340 may be configured to send information related to the service request to the wireless device. For example, the sending module 340 may send the default location to the wireless device. As another example, the sending module 340 may send a candidate default location and a corresponding overall probability value that the candidate default location is the default location to the wireless device.

The configuration module 340 may be configured to establish a WiFi fingerprint library. For example, the configuration module 340 collect a WiFi fingerprint detected by each wireless device of a plurality of wireless devices that appeared within a distance from a structure. As another example, the configuration module 340 may establish the WiFi fingerprint library based on the WiFi fingerprint collected from the plurality of wireless devices. As still another example, the configuration module 340 may label the structure onto a map.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth™, a ZigBee™, a Near Field Communication (NFC), or the like, or any combination thereof. Two or more of the modules may be combined as a single module, and any one of the modules may be divided into two or more units. For example, the obtaining module 310 may be integrated in the sending module 340 as a single module which may both obtain the positioning request from the wireless device and send the default location to the wireless device. As still another example, the configuration module 340 may be divided into three units of a collecting unit, a labeling unit, and a establishing unit to implement the functions of the configuration module 340, respectively.

Figure 4:
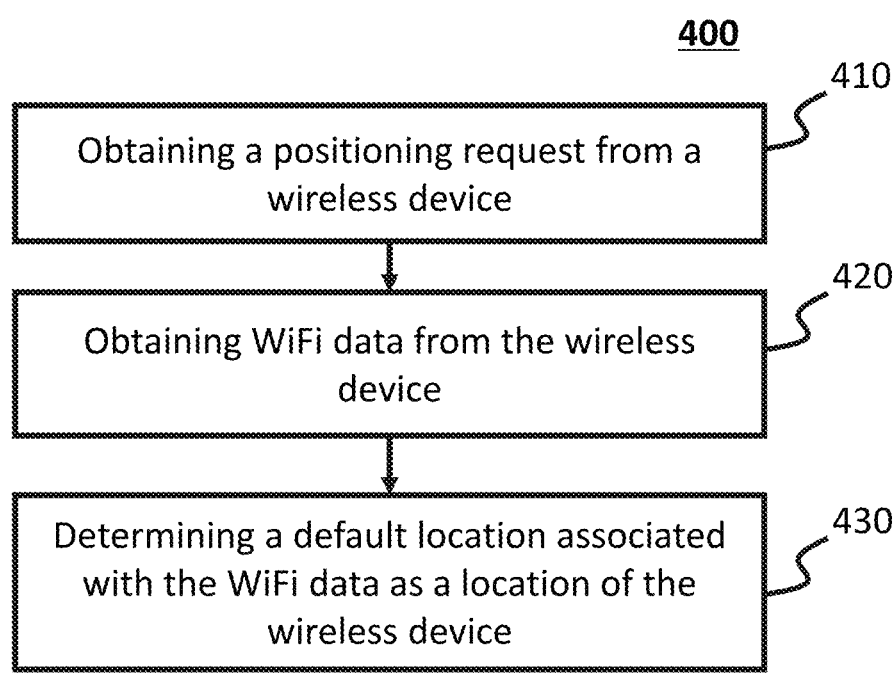
FIG. 4 is a flowchart of an exemplary process for locating a wireless device according to some embodiments.

FIG. 4 is a flowchart of an exemplary process and/or method 400 for locating a wireless device according to some embodiments. In some embodiments, the process 400 may be implemented in the system 100 illustrated in FIG. 1. For example, the process 400 may be stored in the database 150 and/or the storage (e.g., the ROM 230, the RAM 240, etc.) as a form of instructions, and invoked and/or executed by the server 110 (e.g., the processing engine 112 in the server 110, the processor 220 of the processing engine 112 in the server 110, or one or more components in the processing engine 112 illustrated in FIG. 3).

In step 410, the processor 220 may obtain a positioning request from a wireless device.

The processor 220 may be a computer server processor in an online on-demand service platform (e.g., such as transportation service platform), such as the system 100. In some embodiments, the positioning request may be included in a service request, such as when a passenger requests a taxi service. For example, when a passenger terminal 130 sends a service request to the server 110 through an application implemented in a passenger terminal (e.g., a wireless device such as a smart phone) of the passenger, the passenger terminal may include a positioning request in the service request. Accordingly, the processor 220 may obtain the positioning request from the passenger terminal 130.

In some embodiments, the wireless device may be in communication with at least one WiFi network. The positioning request may include a user identifier of the wireless device, at least one WiFi network detected from the wireless device, a trace of locations of the wireless device according to GPS signal associated with the wireless device, a time of the positioning request, or the like, or any combination thereof.

In step 420, the processor 220 may obtain WiFi data from the wireless device.

In some embodiments, the WiFi data may include an identity of a WiFi, a signal strength of the WiFi, an Internet protocol address, a router, a domain name server (DNS), or the like, or any combination thereof. In some embodiments, the WiFi data may be displayed as a form of a WiFi list. In some embodiments, the WiFi data may be associated with at least one structure. For example, the at least one structure may be one or more buildings, bridges, construction sites, or subway stations, or the like, or combinations thereof, such as a house, a shopping mall, or a architectural complex. The at least one structure may also be one or more bridges, construction sites, subway stations, or the like. The WiFi data may be obtained inside or among the at least one structure.

In step 430, the processor 220 may determine a default location associated with the WiFi data as a location of the wireless device.

In some embodiments, the default location may include a predetermined location determined by the server 110 of the on-demand service system 100. For example, the default location may include an entrance of a structure, an exit of the structure, a parking lot around the structure, a bus stop around the structure, a crossing of a road around the structure, a particular place inside the structure, a geometric center of a structure, a pre-determined weighted center of a structure, or the like, or any combination thereof. In some embodiments, the default location may be send to the on-demand system 100 as a starting position of the request. For example, when a user of the wireless device requesting for a taxi through the on-demand system 100, the entrance of the structure associated with the WiFi data may be send to the on-demand system 100 as the starting location of the request for the taxi. In some embodiments, the method of determination of the default location based on the WiFi data may be described as the process 600 illustrated in FIG. 6 and the process 800 illustrated in FIG. 8 in the present disclosure.

Figure 5:
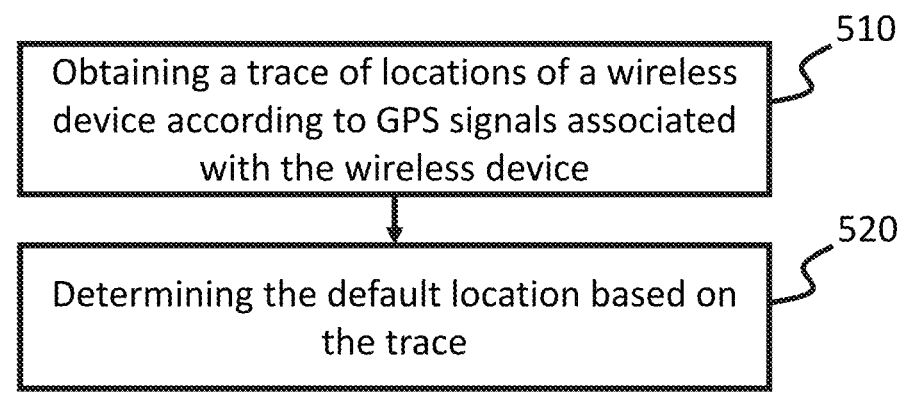
FIG. 5 is a flowchart of an exemplary process for locating a wireless device according to some embodiments.

FIG. 5 is a flowchart of an exemplary process 500 for locating a wireless device according to some embodiments. In some embodiments, the processor 220 may perform one or more operations as described in both FIG. 4 and FIG. 5 for locating the wireless device. In some embodiments, the process 500 may be implemented in the system 100 illustrated in FIG. 1. For example, the process 500 may be stored in the database 150 and/or the storage (e.g., the ROM 230, the RAM 240, etc.) as a form of instructions, and invoked and/or executed by the server 110 (e.g., the processing engine 112 in the server 110, the processor 220 of the processing engine 112 in the server 110, or one or more components in the processing engine 112 illustrated in FIG. 3).

In step 510, the processor 220 may obtain a trace of the locations of a wireless device according to GPS signals associated with the wireless device.

In some embodiments, the wireless device may include a GPS application, and therefore, may receive GPS signal about its own location. The wireless device may remain communication with the processor 220 through the system 100. Therefore, the processor 220 may receive the GPS location and/or signal from the wireless device. By continuously monitoring the GPS location of the wireless device, the processor 220 may obtain a trace of the location of the wireless device according to the GPS signals.

When a service requester carries the wireless device into the at least one structure, such as when the service requester enters a shopping mall, the GPS signals may be shielded by the at least one structure. Meanwhile, the wireless device may connect to a WiFi network in the at least one structure.

Therefore, the trace of the locations may include a breakpoint at where the at least one WiFi network is located.

In step 520, the processor 220 may determine the default location based on the trace.

For example, when the service requester carries the wireless device and enters a building shielding the GPS signals, a breakpoint of the wireless device's trace of locations may appear at the entrance of the building. Therefore, when the breakpoint appears in the trace of locations, the processor 220 may determine that the default location is an entrance associated with the at least one structure that shields the GPS signals.

In some embodiments, the processor 220 may instruct the wireless device to select the type of signals to obtain based on the signal that the wireless device receives. For example, when the GPS signals that the wireless device receives are strong, the processor 220 may instruct the wireless device to obtain the trace of locations of the wireless device according to GPS signals. When the GPS signals that the wireless device receivers are weak or disappeared (e.g., the GPS signals are shielded by at least one structure), the processor 220 may instruct the wireless device to obtain WiFi data at the breakpoint of the trace of locations for locating the wireless device.

In some embodiments, the processor 220 may determine the default location based on both the WiFi data obtained in step 420 and the GPS signals obtained in step 510. For example, the processor 220 may determine the default location as an entrance of a structure associated with the WiFi data. The structure shields the GPS signals, and the WiFi data is obtained at the breakpoint of the trace of the locations according to the GPS signals. The processor 220 may also determine that the default location is a predetermined place associated with the structure. For example, other than the entrance of the structure, the processor 220 may determine that the default location is a bus station near the structure where both the service requester and the service provider are convenient to meet.

Figure 6:
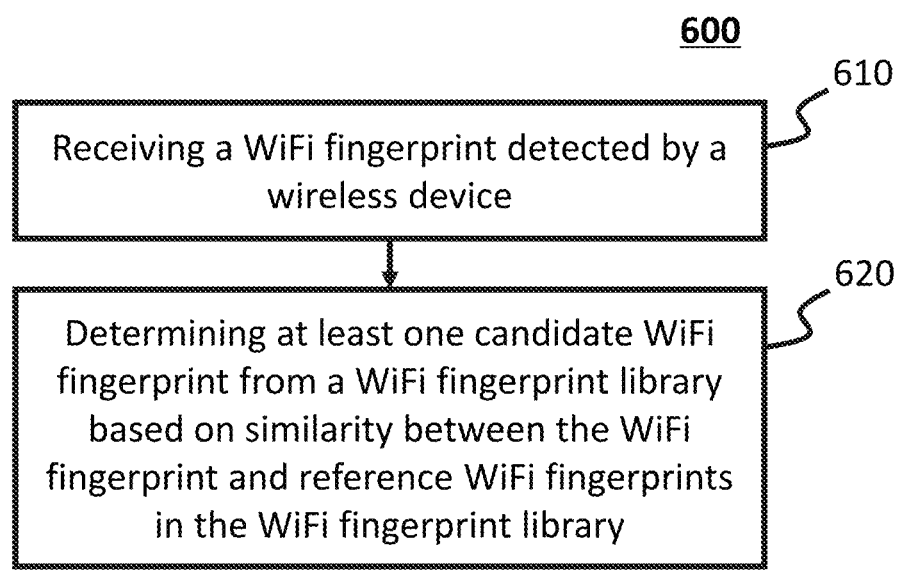
FIG. 6 is a flowchart of an exemplary process for determining a default location of a wireless device according to some embodiments.

FIG. 6 is a flowchart of an exemplary process 600 for determining a default location of a wireless device according to some embodiments. In some embodiments, the process 600 may be implemented in the system 100 illustrated in FIG. 1. For example, the process 600 may be stored in the database 150 and/or the storage (e.g., the ROM 230, the RAM 240, etc.) as a form of instructions, and invoked and/or executed by the server 110 (e.g., the processing engine 112 in the server 110, the processor 220 of the processing engine 112 in the server 110, or one or more components in the processing engine 112 illustrated in FIG. 3).

For example, after the wireless device enters the at least one structure and fails to receive GPS signal, the wireless device may collect WiFi information around it and send a WiFi fingerprint to the system 100. Accordingly, the system 100 may receive the WiFi fingerprint after the breakpoint of the trace of location appears, and then determine the default location of the wireless device according to the WiFi fingerprint.

In step 610, the processor 220 may receive a WiFi fingerprint detected by a wireless device. In some embodiments, the wireless device may communicate with at least one WiFi network to obtain a WiFi list. For example, when the service requester enters in a shopping mall (i.e., a building) where the GPS signal is too weak, the wireless device may connect to a WiFi network in the shopping mall, and then obtain a list of WiFis available in the shopping mall. The WiFi list may be all WiFis located in the at least one structure, such as the shopping mall. Alternatively, the WiFi list may be part of the WiFis located in the at least one structure. The WiFi list may include a plurality of WiFi identifiers, a plurality of corresponding receive signal strengths, a plurality of corresponding status, or the like, or any combination thereof. The processor 220 may determine the WiFi fingerprint from the WiFi list.

In some embodiments, the WiFi fingerprint may include a set of statuses of WiFi signals at some locations. For example, the WiFi fingerprint may include identifications (i.e., IDs) of a set of WiFis, which includes all or part of the WiFis detected by the wireless device at a location. The WiFi fingerprint may also include a signal strength of each of the set of WiFis, a security status of each of the set of WiFis, a protection status of each of the set of WiFis, and/or a lock status of each of the set of WiFis, or the like, or any combination thereof.

In step 620, the processor 220 may determine at least one candidate WiFi fingerprint from a WiFi fingerprint library based on similarity between the WiFi fingerprint and reference WiFi fingerprints in the WiFi fingerprint library.

The WiFi fingerprint library may be a collection of a plurality of reference WiFi fingerprints at reference locations in the at least one structures. The library may be implemented as a form of database stored in the system 100, or a database accessible through a WiFi network in the at least one structures, thereby available to processor 220 through the wireless device. The reference locations and the reference WiFi fingerprints in the library may be of a one-to-one relation, or may be in a multiple-to-multiple relation. Accordingly, the candidate default locations and their corresponding candidate WiFi fingerprints may be of one-to-one relation, or may be in a multiple-to-multiple relation. For example, each of the at least one candidate WiFi fingerprint may be associated with at least one candidate default location; and each candidate default location may be associated with at least one candidate WiFi fingerprint.

In some embodiments, the WiFi fingerprint library may be predetermined and stored in the database 150 and/or the storage (e.g., the ROM 230, the RAM 240, etc.). In some embodiments, the WiFi fingerprint library may be established as the process 900 illustrated in FIG. 9 in the present disclosure. In some embodiments, the processor 220 may update the WiFi fingerprint library after a locating process of each wireless device.

In some embodiments, the processor 220 may determine the similarity between the WiFi fingerprint and reference WiFi fingerprints in the WiFi fingerprint library by matching the WiFi fingerprint with the reference WiFi fingerprints in the WiFi fingerprint library to determine the at least one candidate WiFi fingerprint. For example, the WiFi fingerprint may be matched with the reference WiFi fingerprints in the WiFi fingerprint library according to a matching algorithm. The matching algorithm may include a distance algorithm, a similarity algorithm, a Hashing algorithm, or the like, or any combination thereof. The distance algorithm may include a Euclidean distance algorithm, a Manhattan distance algorithm, a Chebyshev distance algorithm, a Mahalanobis distance algorithm, or the like, or any combination thereof. The similarity algorithm may include a cosine similarity algorithm, a Pearson correlation coefficient algorithm, a Jaccard coefficient algorithm, an adjusted cosine similarity algorithm, or the like, or any combination thereof. The Hashing algorithm may include a minHash algorithm, a simHash algorithm, etc.

For illustration purpose, the cosine similarity algorithm may be described herein as an example to determine the at least one candidate WiFi fingerprint from the WiFi fingerprint library. The WiFi fingerprint and a WiFi fingerprint in the WiFi fingerprint library may be represented as two vectors. The similarity between the two vectors may be measured by a cosine of an angle of the two vectors. The vector of the WiFi fingerprint may be represented as vector A: A=(A1, A2, . . . , An). The vector of the WiFi fingerprint in the WiFi fingerprint library may be represented as vector B: B=(B1, B2, . . . , Bn). The cosine value of the vector A and the vector B may be represented as formula 1:

$$\cos\theta = \frac{\sum_1^n (A_i * B_i)}{\sqrt{\sum_1^n A_i^2} * \sqrt{\sum_1^n B_i^2}} \qquad (1)$$

The cosine value is within a range from −1 to 1. The angel of the vector A and the vector B is close to 0 degree when the corresponding cosine value is close to 1.

In some embodiments, the corresponding cosine value that is larger than a predetermined threshold may be determined as the at least one candidate WiFi fingerprint. The predetermined threshold may be varied according to different application seniors. For example, the predetermined threshold may be within a range from 0.6 to 1. As another example, the predetermined threshold may be within a range from 0.7 to 1. As still another example, the predetermined threshold may be 0.8 to 1.

In some embodiments, the operations of the illustrated process 600 presented above are intended to be illustrative. The process 600 may be accomplished with one or more additional operations not described. For example, before receiving the WiFi fingerprint detected by the wireless device in step 610, the processor 220 may determine a rough position of the wireless device. The rough position of the wireless device may include a position inside a structure, a position outside a structure, a position among a group of structures, or the like, or any combination thereof. For example, the processor 220 may implement step 610 for receiving the WiFi fingerprint detected by the wireless device when first determining the wireless device locates inside the structure or among the group of structures.

Figure 7:
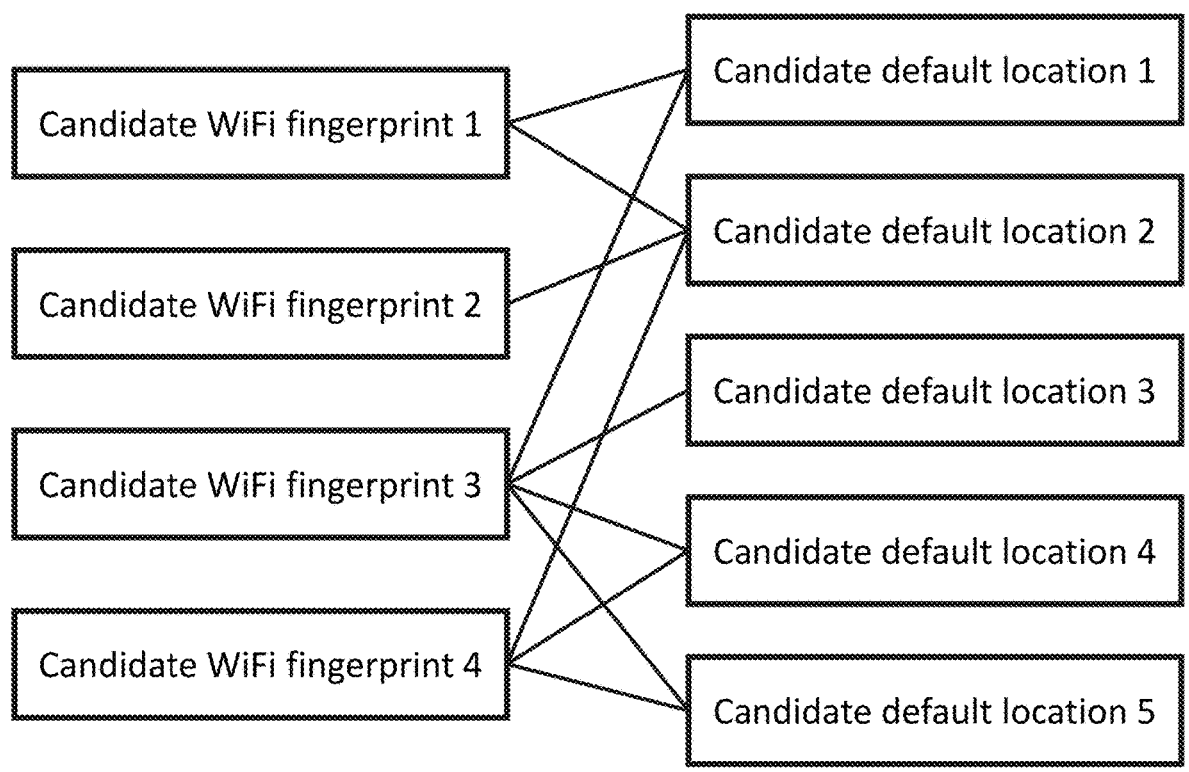
FIG. 7 is a diagram of an exemplary relationship between at least one candidate WiFi fingerprint and at least one candidate default location according to some embodiments.

For illustration purpose, FIG. 7 shows a diagram of an exemplary relationship between the at least one candidate WiFi fingerprint and the at least one candidate default location. The relationship between the at least one candidate WiFi fingerprint and the at least one candidate default location may be represented as a connection of a line. For example, the candidate WiFi fingerprint 1 is associated with the candidate default location 1 and candidate default location 2. The candidate WiFi fingerprint 2 is associated with candidate default location 2. Candidate WiFi fingerprint 3 is associated with candidate default location 1, candidate default location 3, candidate default location 4 and candidate default location 4. As another example, the candidate default location 1 is associated with the candidate WiFi fingerprint 1 and the candidate WiFi fingerprint 4. The candidate default location 2 is associated with the candidate WiFi fingerprint 1, the candidate WiFi fingerprint 2 and the candidate WiFi fingerprint 4. The candidate default location 3 is associated with the candidate WiFi fingerprint 3.

Figure 8:
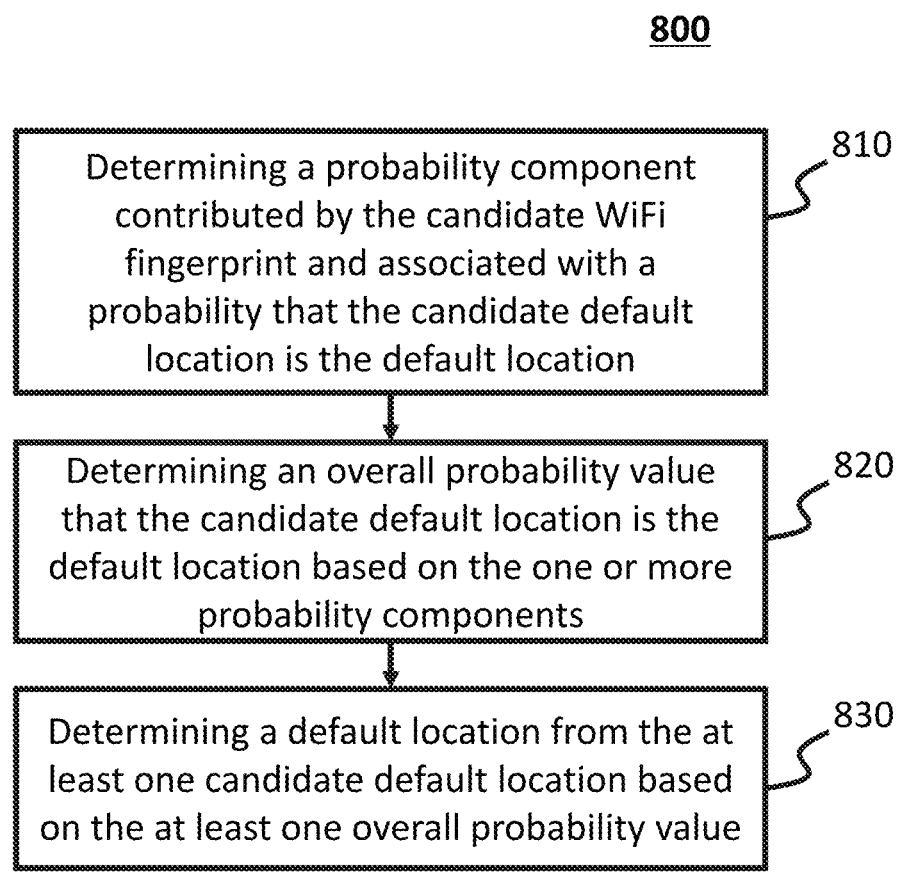
FIG. 8 is a flowchart of an exemplary process for determining a default location of a wireless device according to some embodiments.

FIG. 8 is a flowchart of an exemplary process 800 for determining a default location according to some embodiments. In some embodiments, the process 800 may be implemented in the system 100 illustrated in FIG. 1. For example, the process 800 may be stored in the database 150 and/or the storage (e.g., the ROM 230, the RAM 240, etc.) as a form of instructions, and invoked and/or executed by the server 110 (e.g., the processing engine 112 in the server 110, the processor 220 of the processing engine 112 in the server 110, or one or more components in the processing engine 112 illustrated in FIG. 3). In some embodiments, the process 800 may be implemented for each candidate default location of the at least one candidate default location illustrated in FIG. 6.

In some embodiments, for a candidate default location of the at least one candidate default location, the processor 220 may identify one or more candidate WiFi fingerprints associated with the candidate default location. For example, the processor 220 may identify the one or more candidate WiFi fingerprint associated with the candidate default location from the WiFi fingerprint library.

In step 810, for each of the one or more candidate WiFi fingerprint, the processor 220 may determine a probability component contributed by the candidate WiFi fingerprint, wherein the probability component is associated with a probability that the candidate default location is the default location.

In some embodiments, each candidate default location associated with at least one candidate WiFi fingerprint may include a probability component contributed by each candidate WiFi fingerprint of the at least one candidate WiFi fingerprint. The probability component may include a probability that the candidate default location is the default location. For example, the probability component may include a confidence coefficient, a differentiation degree (e.g., a changing difference of the WiFi fingerprint similarity with a distance), a similarity, or the like, or any combination thereof. In some embodiments, the probability component contributed by each candidate WiFi fingerprint associated with the candidate default location may be stored in the WiFi fingerprint library. The processor 220 may determine the probability component contributed by each candidate WiFi fingerprint from the WiFi fingerprint library. For illustration purpose, the probability component of the candidate default location 1 illustrated in FIG. 7 may be described as an example. The candidate WiFi fingerprint 1 may contribute 50% to the candidate default location 1 that the candidate default location 1 is the default location. The candidate WiFi fingerprint 3 may contribute 35% to the candidate default location 1 that the candidate default location 1 is the default location.

In step 820, the processor 220 may determine an overall probability value that the candidate default location is the default location based on the one or more probability components.

For example, the overall probability value of the candidate default location 1 may be determined based on the 50% contributed by the candidate WiFi fingerprint 1, the 35% contributed by the candidate WiFi fingerprint 2, and 15% contributed by other candidate WiFi fingerprint. In some embodiments, the overall probability value that the candidate default location is the default location may include a joint probability of the at least one probability component. For example, the overall probability value may include a joint confidence coefficient, a joint differentiation degree, a joint similarity, or the like, or any combination thereof. In some embodiments, the processor 220 may determine a list of at least one overall probability value of the at least one candidate default location.

In step 830, the processor 220 may determine a default location from the at least one candidate default location based on the at least one overall probability value. In some embodiments, the processor 220 may determine the default location from the at least one candidate default location based on the list of the at least one overall probability value of the at least one candidate default location.

In some embodiments, the processor 220 may determine the candidate default location that has an overall probability value larger than a probability threshold as the default location. In some embodiments, the probability threshold may be predetermined by the on-demand system 100. In some embodiments, the probability threshold may be varied according to different application scenarios of the on-demand system 100.

In some embodiments, the processor 220 may determine an order and/or ranking of each candidate default location based on the overall probability value thereof. The order and/or ranking may include an ascending order, a descending order, etc. The processor 220 may select a candidate default location with the highest overall probability value as the default location. Alternatively, the processor 220 may determine a predetermined number of candidate default locations as the default location. In some embodiments, the default location may be at least one. In some embodiments, the predetermined number may be determined by the on-demand system 100. In some embodiments, the predetermined number may be varied according to different application scenarios of the on-demand system 100.

In some embodiments, the processor 220 may send the default location and the overall probability value of the default location to the wireless device. The default location may include at least one. The user of the wireless device may select one of the at least one default location as a final default location. In some embodiments, the default location of the wireless device may be identified for the user to search quickly. In some embodiments, the default location may be sent to the user of the wireless device based on a location result of the last time and a predetermined probability for jumping to the default location.

Figure 9:
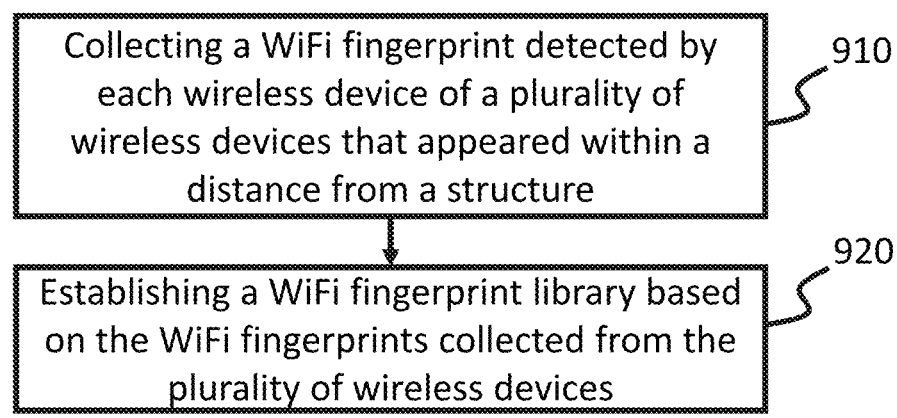
FIG. 9 is a flowchart of an exemplary process for establishing a WiFi fingerprint library according to some embodiments.

FIG. 9 is a flowchart of an exemplary process 900 for establishing a WiFi fingerprint library according to some embodiments. In some embodiments, the process 900 may be implemented in the system 100 illustrated in FIG. 1. For example, the process 900 may be stored in the database 150 and/or the storage (e.g., the ROM 230, the RAM 240, etc.) as a form of instructions, and invoked and/or executed by the server 110 (e.g., the processing engine 112 in the server 110, the processor 220 of the processing engine 112 in the server 110, or one or more components in the processing engine 112 illustrated in FIG. 3).

In step 910, the processor 220 may collect a WiFi fingerprint detected by each wireless device of a plurality of wireless devices that appeared within a distance from a structure.

In some embodiments, the WiFi fingerprint may include a WiFi, a signal strength of the WiFi, a security status, a protection status, a lock status, a number of appearance of the WiFi at a structure, or the like, or any combination thereof.

In some embodiments, the processor 220 may collect a trace of locations according to GPS signals detected by the each wireless device of the plurality of wireless devices that appeared within the distance from the structure. In some embodiments, the trace of locations may be shielded by the structure. The trace of locations of the GPS signals may include a breakpoint. The WiFi fingerprint may be detected at the breakpoint of the trace of locations of the GPS signals. In some embodiments, the distance may be determined by the on-demand system 100. In some embodiments, the distance may be varied according to different application scenarios of the on-demand system 100.

In some embodiments, the processor 220 may collect the WiFi fingerprint detected by each wireless device of a plurality of wireless devices that appeared within a distance from a structure within a period of time. The period of time may be predetermined by the on-demand system 100. For example, the period of time may include a year, a month, a week, a day, an hour, or the like, or any combination thereof.

In some embodiments, the processor 220 may collect the WiFi fingerprint detected by the each wireless device of the plurality of wireless devices based on a predetermined criterion. The predetermined criterion may include a determination that the breakpoint of each trace of locations of the GPS signals is detected at the same or similar location.

In some embodiments, the processor 220 may determine the number of appearance of each WiFi at the structure. The processor 220 may determine the WiFi fingerprint of each WiFi based on the number of appearance.

In step 920, the processor 220 may establish a WiFi fingerprint library based on the WiFi fingerprints collected from the plurality of wireless devices.

In some embodiments, the WiFi fingerprint library may be stored in the database 150 and/or the storage (e.g., the ROM 230, the RAM 240, etc.). In some embodiments, the processor 220 may update the WiFi fingerprint library after a locating process of each wireless device.

In some embodiments, the processor 220 may establish the WiFi fingerprint library in virtue of an interface of a map including a plurality of structures. The interface of the map may be divided into a plurality of areas. Each structure of the plurality of structures may be labeled onto the center of corresponding area of the plurality of areas. The breakpoint of each trace of locations according to the GPS signals may be labeled on the corresponding structure on the map. In some embodiments, the processor 22 may determine that the breakpoints on the map associated with a structure of the plurality of structures detected by the plurality of wireless devices are the same or similar to collect the corresponding WiFi fingerprints.

For illustration purpose, the map may be divides into several mesh areas. The center of each mesh area may be represented as $\{P_0, P_1, P_2, \ldots, P_n\}$, and n represents the number of the mesh areas. The breakpoint of each trace of locations according to GPS signals may be labeled on the corresponding center of the mesh areas based on the GPS signals detected by the plurality of wireless devices. The breakpoints may be determined at the same or similar center of the mesh areas. The WiFi that the plurality of wireless devices detected may be represented as $\{W_0, W_1, W_2, \ldots, W_m\}$, and m represents the number of WiFi. The processor 220 may determine the number of appearance of each WiFi at the center of the mesh areas as p ($P_{Wi}=P_i$). The WiFi fingerprint of each WiFi may be represented as $FP_{Wi}=\{p (P_{Wi}=P_i), i=0, 1, 2, \ldots\}$. The WiFi fingerprint library may be established based on the WiFi fingerprint of each WiFi.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for determining a default location of a wireless device, comprising:
    at least one computer-readable storage medium including a set of instructions for determining a default location of a wireless device; and
    at least one processor in communication with the computer-readable storage medium, wherein when executing the set of instructions, the at least one processor is directed to cause the system to perform operations including:
        obtaining WiFi data from the wireless device, the wireless device being in communication with at least one WiFi network associated with at least one structure;
        determining a WiFi fingerprint of the WiFi data;
        determining at least one candidate WiFi fingerprint based on the WiFi fingerprint and a WiFi fingerprint library, the at least one candidate WiFi fingerprint corresponding to at least one candidate default location; and
        determining, based at least on the at least one candidate WiFi fingerprint, a default location associated with the at least one structure by:
            for a candidate default location of the at least one candidate default location,
                identifying one or more candidate WiFi fingerprints associated with the candidate default location;
                for each of the one or more candidate WiFi fingerprints, determining a probability component contributed by the candidate WiFi fingerprint and associated with a probability that the candidate default location is the default location; and
                determining an overall probability value that the candidate default location is the default location based on the one or more probability components; and determining the default location from the at least one candidate default location based at least on the at least one overall probability value.

2. The system of claim 1, wherein the WiFi fingerprint includes a combination of:
   identity of at least one WiFi detected by the wireless device; and
   signal strength of the at least one WiFi.

3. The system of claim 1, wherein the WiFi fingerprint library includes a plurality of reference WiFi fingerprints and a plurality of reference locations, each of the plurality of reference WiFi fingerprints being associated with at least one reference location and each of the plurality of reference locations being associated with at least one reference WiFi fingerprint.

4. The system of claim 3, wherein the determining the at least one candidate WiFi fingerprint based on the WiFi fingerprint and the WiFi fingerprint library includes:
   determining a similarity between the WiFi fingerprint and each of the plurality of reference WiFi fingerprints; and
   determining, from the plurality of reference locations, the at least one candidate WiFi fingerprint based on the plurality of similarities.

5. The system of claim 4, wherein a similarity between the WiFi fingerprint and a candidate WiFi fingerprint is greater than a similarity threshold.

6. The system of claim 1, wherein the WiFi fingerprint library is obtained by:
   for each of a plurality of wireless devices that appeared within a distance from the at least one structure, collecting a WiFi fingerprint detected by the wireless device; and
   establishing the WiFi fingerprint library based on the WiFi fingerprints collected from the plurality of wireless devices.

7. The system of claim 1, wherein the determining, based at least on the at least one candidate WiFi fingerprint, the default location associated with the at least one structure includes:
   obtaining a trace of locations of the wireless device based on GPS signals received from the wireless device; and
   determine the default location based on the trace and the at least one candidate WiFi fingerprint.

8. The system of claim 7, wherein the at least one structure shields the GPS signals, and the trace includes a breakpoint at where the at least one WiFi network is located.

9. The system of claim 1, wherein the default location includes at least one of an entrance of the at least one specific structure, an exit of the at least one specific structure, a parking lot around the at least one specific structure, a bus stop around the at least one specific structure, a particular place inside the structure, a geometric center of a structure, or a pre-determined weighted center of a structure.

10. The system of claim 1, wherein the operations further include:
    determining the default location as a service location of a service request; and
    sending the default location to a service provider terminal as the service location to provide a service for a service requester of the wireless device.

11. A method for determining a default location of a wireless device, comprising:
    obtaining WiFi data from the wireless device, the wireless device being in communication with at least one WiFi network associated with at least one structure;
    determining a WiFi fingerprint of the WiFi data;
    determining at least one candidate WiFi fingerprint based on the WiFi fingerprint and a WiFi fingerprint library, the at least one candidate WiFi fingerprint corresponding to at least one candidate default location; and
    determining, based at least on the at least one candidate WiFi fingerprint, a default location associated with the at least one structure by:
       for a candidate default location of the at least one candidate default location,
          identifying one or more candidate WiFi fingerprints associated with the candidate default location;
          for each of the one or more candidate WiFi fingerprints, determining a probability component contributed by the candidate WiFi fingerprint and associated with a probability that the candidate default location is the default location; and
          determining an overall probability value that the candidate default location is the default location based on the one or more probability components; and
       determining the default location from the at least one candidate default location based at least on the at least one overall probability value.

12. The method of claim 11, wherein the WiFi fingerprint includes a combination of:
    identity of at least one WiFi detected by the wireless device; and
    signal strength of the at least one WiFi.

13. The method of claim 11, wherein the WiFi fingerprint library includes a plurality of reference WiFi fingerprints and a plurality of reference locations, each of the plurality of reference WiFi fingerprints being associated with at least one reference location and each of the plurality of reference locations being associated with at least one reference WiFi fingerprint.

14. The method of claim 13, wherein the determining the at least one candidate WiFi fingerprint based on the WiFi fingerprint and the WiFi fingerprint library includes:
    determining a similarity between the WiFi fingerprint and each of the plurality of reference WiFi fingerprints; and
    determining, from the plurality of reference locations, the at least one candidate WiFi fingerprint based on the plurality of similarities, wherein a similarity between the WiFi fingerprint and a candidate WiFi fingerprint is greater than a similarity threshold.

15. The method of claim 11, wherein the WiFi fingerprint library is obtained by:
    for each of a plurality of wireless devices that appeared within a distance from the at least one structure, collecting a WiFi fingerprint detected by the wireless device; and
    establishing the WiFi fingerprint library based on the WiFi fingerprints collected from the plurality of wireless devices.

16. The method of claim 11, wherein the determining, based at least on the at least one candidate WiFi fingerprint, the default location associated with the at least one structure includes:
    obtaining a trace of locations of the wireless device based on GPS signals received from the wireless device; and
    determine the default location based on the trace and the at least one candidate WiFi fingerprint.

17. The method of claim 11, wherein the default location includes at least one of an entrance of the at least one specific structure, an exit of the at least one specific structure, a parking lot around the at least one specific structure, a bus stop around the at least one specific structure, a particular place inside the structure, a geometric center of a structure, or a pre-determined weighted center of a structure.

18. A non-transitory computer readable medium, comprising at least one set of instructions for determining a default location of a wireless device, wherein when executed by at least one processor of a computer server, the at least one set of instructions directs the at least one processor to execute a method, the method comprising:
  obtaining WiFi data from the wireless device, the wireless device being in communication with at least one WiFi network associated with at least one structure;
  determining a WiFi fingerprint of the WiFi data;
  determining at least one candidate WiFi fingerprint based on the WiFi fingerprint and a WiFi fingerprint library, the at least one candidate WiFi fingerprint corresponding to at least one candidate default location; and
  determining, based at least on the at least one candidate WiFi fingerprint, a default location associated with the at least one structure by:
    for a candidate default location of the at least one candidate default location,
      identifying one or more candidate WiFi fingerprints associated with the candidate default location;
      for each of the one or more candidate WiFi fingerprints, determining a probability component contributed by the candidate WiFi fingerprint and associated with a probability that the candidate default location is the default location; and
      determining an overall probability value that the candidate default location is the default location based on the one or more probability components; and
    determining the default location from the at least one candidate default location based at least on the at least one overall probability value.

* * * * *